United States Patent [19]
Wainwright

[11] Patent Number: 5,488,715
[45] Date of Patent: Jan. 30, 1996

[54] PROCESS FOR INTEGRATED TRAFFIC DATA MANAGEMENT AND NETWORK SURVEILLANCE IN COMMUNICATIONS NETWORKS

[75] Inventor: Paul F. Wainwright, Monmouth, N.J.

[73] Assignee: AT&T Corp., Murray Hill, N.J.

[21] Appl. No.: 284,019

[22] Filed: Aug. 1, 1994

[51] Int. Cl.⁶ .................................................. G06F 11/34
[52] U.S. Cl. ................................................ 395/182.02
[58] Field of Search ................................. 395/575, 550; 371/25.1, 20.1, 11.2, 15.1, 21.4, 61, 67.1, 68.2; 379/2, 224, 137, 14, 16, 34

[56] References Cited

U.S. PATENT DOCUMENTS

| | | |
|---|---|---|
| 4,200,771 | 4/1980 | Kraushaar et al. . |
| 4,319,090 | 3/1982 | Garwood et al. . |
| 4,456,788 | 6/1984 | Kline et al. ............................ 179/7.1 R |
| 4,464,543 | 8/1984 | Kline et al. ............................ 179/8 R |
| 4,669,113 | 5/1987 | Ash et al. . |
| 4,959,849 | 9/1990 | Bhusri . |
| 5,042,064 | 8/1991 | Chung et al. . |
| 5,223,827 | 6/1993 | Bell et al. . |
| 5,285,494 | 2/1994 | Sprecher et al. . |

*Primary Examiner*—Robert W. Beausoliel, Jr.
*Assistant Examiner*—Phung My Chung

[57] ABSTRACT

The dual operations of traffic data analysis and network surveillance in a telecommunications network are integrated to allow maintenance personnel to readily assess the impact of network element problems on the level of service. More specifically, the present invention utilizes traffic data measurements to monitor the level of service provided by various network components. By utilizing real-time or near real-time traffic data in this manner, switch maintenance activities may be prioritized so that, for example, equipment malfunctions having the greatest impact on the level of service may receive attention before those having little or no impact on service.

11 Claims, 3 Drawing Sheets

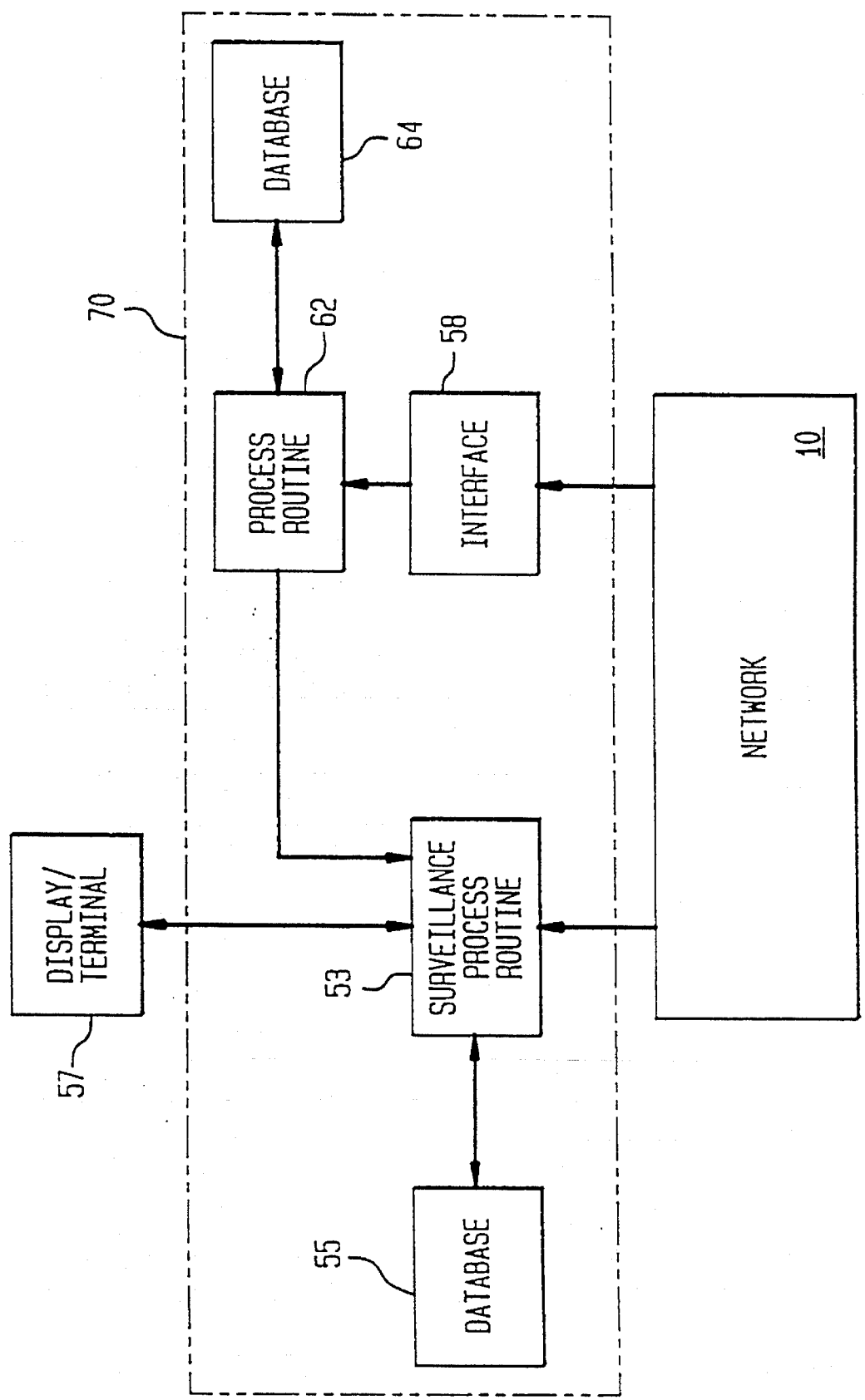

PROCESS FOR INTEGRATED TRAFFIC DATA MANAGEMENT AND NETWORK SURVEILLANCE IN COMMUNICATIONS NETWORKS

BACKGROUND OF THE INVENTION

1. Field of the Invention

The present invention generally relates to data processing and communications systems and, more particularly, to network control stations and systems in which traffic data analysis is utilized to identify maintenance problems affecting the level of service provided to subscribers and to prioritize maintenance activities so as to optimize the level of service.

2. Description of the Related Art

In a voice and/or data communication system, a failure to establish calls upon request from subscribers results in significant loss of revenue to the respective communications carrier. Such failures may, for example, result from errors in databases, or in network elements themselves such as switches, network control points, signal transfer points, and the like. Clearly, downtime and associated deterioration in customer service quality and lost revenues could be minimized by surveillance techniques that detect at the earliest opportunity the onset and cause of failure.

Current surveillance techniques, effected by maintenance operation systems, detect and segment faults by noting the occurrence of a fault and identifying the suspected faulting network element. For this purpose, a network element may report data on equipment failures. The reported data, commonly referred to as surveillance data, thus relates only to failures associated with that network element.

Although the need to identify and correct maintenance problems is certainly vital if a consistently high level of service is to be provided to network customers, it is also necessary to continually upgrade equipment and expand capacity to keep up with rapid increases in network usage. For this reason, data concerning the traffic carried by the network (e.g., call attempts, usage, calls successfully placed in a trunk group) is typically gathered and reported for subsequent analysis. Such "traffic" data is generally collected by computer from the network at pre-determined intervals, and from various types of network elements such as voice switches, packet switches, and STPs, and may be used by network planners, for example, to determine the appropriate link sizes so that the network may achieve a predetermined grade of service and the optimum route selection sequences for use at different time periods for the forecasted traffic load (which is based on projection factors and statistics derived from previous gathering intervals). The traffic information supplied to the network designer is thus currently used to efficiently allocate the physical resources that are already in the field, as well as those contemplated in planned construction. Moreover, analysis of the collected data also permits network personnel to verify whether customers are receiving an appropriate level of service from the network. Also, the traffic data enables the appropriate personnel to view and report on customer usage of particular services, switch modules, or trunks.

Heretofore, network support systems such as those described above for collecting the information required for network surveillance and network element planning have been configured to operate independently of one another. That is, the data collected for the purpose of system planning has not been made available for use by the network management system, even where such information would be useful in the analysis of service-affecting maintenance problems. Accordingly, it would be highly desirable to provide an integrated system in which measurements of abnormal component usage are utilized to analyze and prioritize component maintenance problems. Specifically, by providing traffic data to network surveillance personnel in accordance with the present invention, it may be possible to detect component malfunctions earlier than would otherwise be possible through the use of component surveillance data alone. Moreover, by allowing surveillance personnel to identify those malfunctions having the most significant impact upon the level of service to customers, the present invention makes it possible to prioritize repair operations to the network in a manner which maintains the level of service demanded by its customers.

SUMMARY OF THE INVENTION

The present invention integrates the dual operations of traffic data analysis and network surveillance by allowing maintenance personnel to assess the impact of network element problems on the level of service. More specifically, the present invention utilizes traffic data measurements to monitor the level of service provided by various network components. By utilizing real-time or near real-time traffic data in this manner, switch maintenance activities may be prioritized so that, for example, equipment malfunctions having the greatest impact on the level of service may receive attention before those having little or no impact on service.

An illustrative embodiment of the present invention includes a network of computer workstations for accessing vast amounts of real-time data generated by the numerous elements in a communication network, including but not limited to voice switches, packet switches, and signal transfer points (STPs). The individual user workstations may, for example, operate in a window based environment which facilitates multi-tasking. The software may include an on-line relational data base for rapid manipulation and integration of vast amounts of real-time data. The relational data base provides access by any number of task handlers, including those which can determine whether collected data associated with a particular network component indicates operation within a respective range of at least one corresponding performance parameter. An exception condition is identified when collected data indicates that a network component is operating outside a predetermined range.

Real-time and historical traffic data is utilized for dynamic as well as trend analysis. Real-time traffic data originating from the various network elements flows into a data interface module and is reformatted by a data format module for input into a relational data base of a traffic data management system module. A user interface, which may be a graphical user interface, may be utilized for report generation and system management.

In addition to their use in the collection and processing of traffic data, computers may also be utilized to gather and analyze alarm reports from the network. Such computers are used by technicians to analyze and repair maintenance problems in the network. Large quantities of switch data may thus be stored and manipulated on a real time basis to generate and display network element messages, once or repeatedly over a given time interval, which warn the monitoring technicians of service affecting problems. In this manner, switching, facility, and traffic information may be immediately displayed either graphically or textually at work station terminals located in different work-centers throughout, for example, a telephone company. Specific screens may be invoked in a windowed environment at a terminal when a given alert is received to inform the operator as to the problem or condition being reported.

Thus, in accordance with the present invention, exception conditions identified through the analysis of collected traffic data are presented to network maintenance personnel as alarms which, among other things, enables service affecting problems to be quickly identified and the impact of such problems on the quality of service to be accurately assessed.

The various features of novelty which characterize the invention are pointed out with particularity in the claims annexed to and forming a part of the disclosure. For a better understanding of the invention, its operating advantages, and specific objects attained by its use, reference should be had to the drawing and accompanying descriptive matter in which there are illustrated and described exemplary embodiments of the invention.

BRIEF DESCRIPTION OF THE DRAWINGS

In the drawings, in which like elements are indicated by like reference numerals throughout the several views:

FIG. 2B is a block diagram depicting a network support system constructed in accordance with an alternate embodiment of the present invention.

DETAILED DESCRIPTION OF THE PREFERRED EMBODIMENTS

In the following description of a first preferred embodiment, reference is made to the accompanying drawings which form a part hereof, and in which is shown by way of illustration a specific implementation in which the invention may be practiced. It is to be understood that other and modified embodiments may be utilized and that structural changes may be made without departing from the scope of the present invention.

Figure 1:
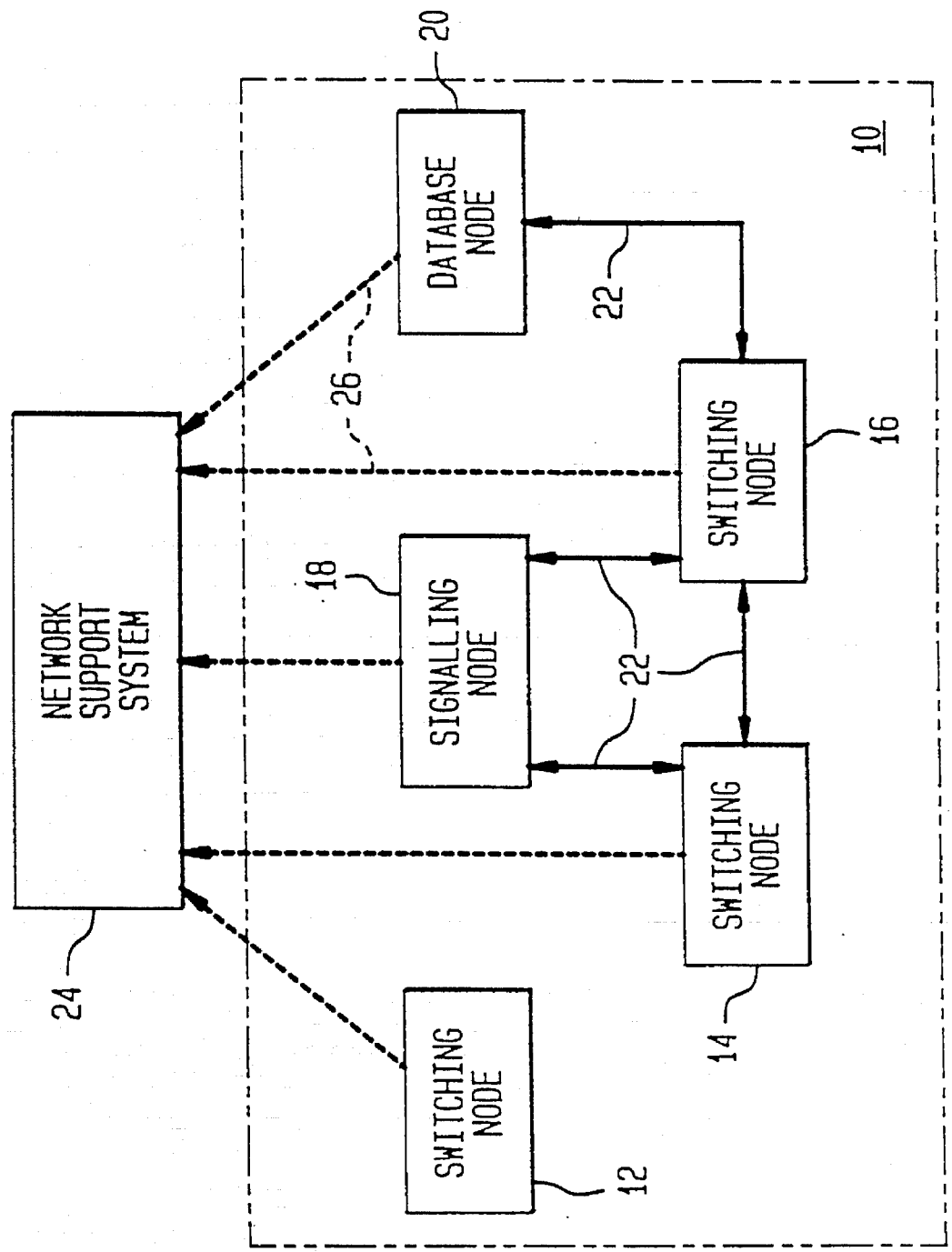
FIG. 1 is a block diagram depicting the use of an integrated network support system in a communications network, in accordance with the present invention.

With initial reference to FIG. 1, there is illustrated a communications network 10 which may be a telephone network such, for example, as the well known AT&T public switched network. Network 10 includes a plurality of switching nodes, as nodes 12, 14, and 16, signaling nodes, as node 18, data base nodes, as node 20, interconnection facilities 22, and other network elements (not shown) that provide networking services to users. The operating characteristics and structures of such network elements are believed to be well known and are not considered a novel aspect of the present invention. Moreover, it should be noted that although specific examples of network elements are discussed herein, it is contemplated that the teachings of the present invention are equally applicable to networks in which other or additional types of elements are or may be used.

As will be readily appreciated by those skilled in the art, many of the network elements depicted in FIG. 1 may be controlled by processors (not shown) that, among other things, are configured to collect usage summary data for the telecommunications service or services they provide. In accordance with the present invention such summary data, herein referred to as network traffic data, is reported to one or more network support systems, as network support system 24, on a periodic basis over data communication paths or links 26. The network traffic data reported may include, by way of example, such typical measurements as the number of events handled by the network element and/or any of its components, the number of failures encountered by the network element and/or any of its components, and the total amount of time that the network element or component was in use or "busy" during each reporting interval. Illustratively, the specific interval for reporting the network traffic data to the network support system 24 is thirty minutes. However, it should be understood that any suitable interval, such as fifteen minutes, thirty minutes, 60 minutes, or daily, may be employed as a general mater of design choice.

In addition to network traffic data, many network elements are able to detect component failures and to generate corresponding messages, hereinafter referred to as network alarm data, indicative of such failures. The network alarm data is also reported to the network support system 24. In the illustrative embodiment depicted in FIG. 1, the network alarm data and network traffic data are both reported to network support system 24 via data links 26. However, it will be readily appreciated by those skilled in the art that separate data links may also be utilized for this purpose.

Figure 2A:
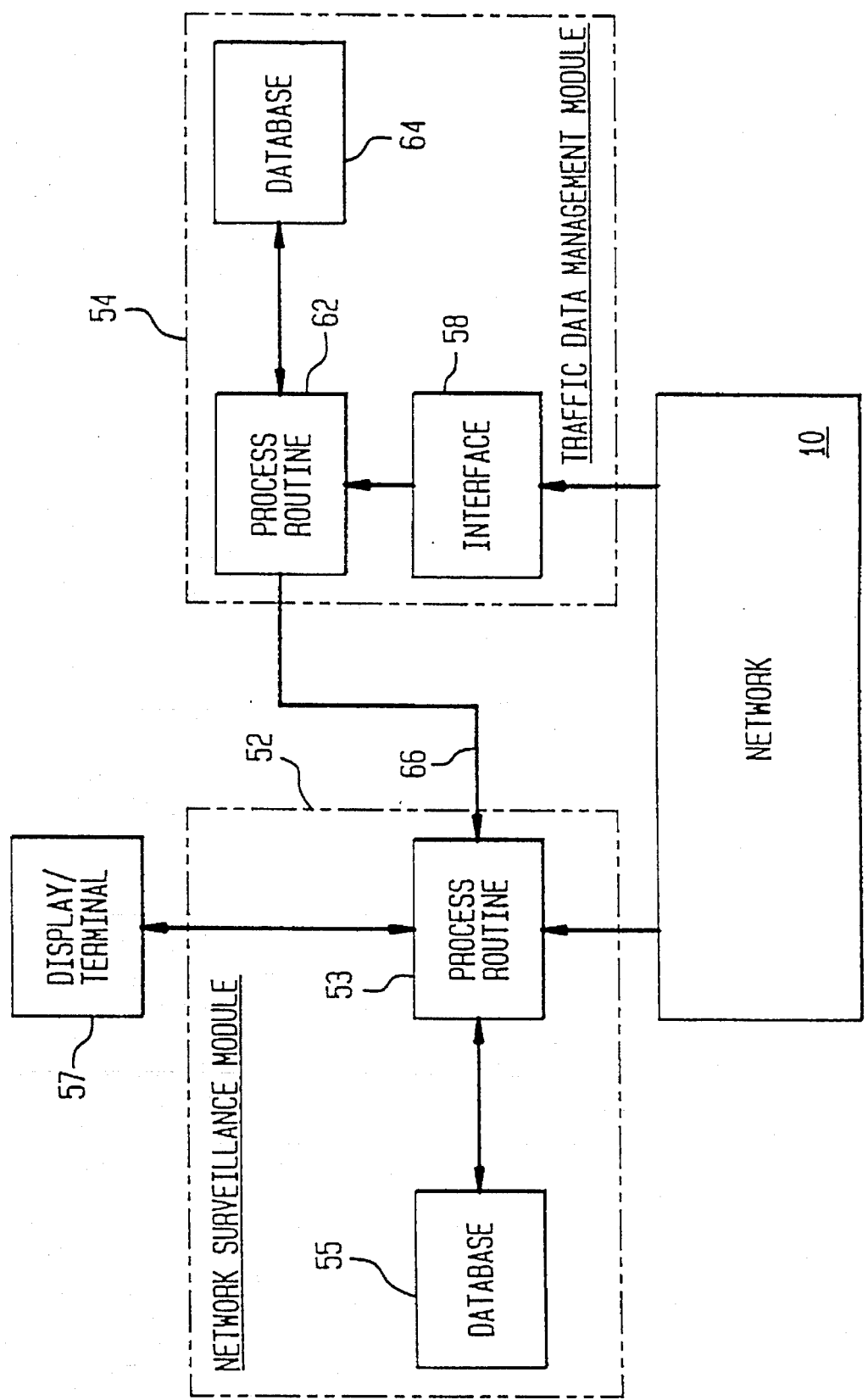
FIG. 2A is a block diagram depicting the components of an illustrative embodiment of the network support system of FIG. 1.

With reference now to FIG. 2A, the network support system 24 will now be described in detail. As seen in FIG. 2A, network support system 24 includes a network surveillance processor or module 52 and a traffic data management processor or module 54. Network surveillance module 52 is designed to detect, isolate and resolve problems such as a fault condition in the communication network 10 by storing and analyzing large quantities of switch surveillance and alarm data on a real time basis. It should, of course, be understood that the specific manner in which such fault conditions and other problems in the network elements are detected is not considered a critical aspect of the present invention and that, as such, any suitable detection scheme may be employed.

In any event, surveillance module 52 includes a process routine 53 for receiving and analyzing the switch data and a database 55 for storing the data. Upon the detection of a fault condition or other network element malfunction, an alarm message is generated to call the attention of a technician to the problem. The alarm message may, of course, take any desired format. In the illustrative embodiment, for example, the alarm is displayed either graphically or textually on a suitable display such as display terminal 57. Alternatively, however, the alarm might take the form of an audible message, utilizing a voice synthesizer or beeper. A trouble ticket might also be generated and sent to another system.

Upon being alerted to the existence of fault conditions and other such network element malfunctions, the monitoring technician has, heretofore, been able to prioritize repairs to the affected elements. A principle aim of prioritizing repairs is to prevent service discontinuities and to maintain the level of service demanded by network customers. This prioritization has typically been based upon the prior experience of the technician with each type of problem. In accordance with the present invention, however, those problems having the largest measured impact on the level of service may be readily identified through the use of real-time and near-real time traffic information, as will now be described.

With continued reference to FIG. 2A, it will be seen that the traffic data management module 54 includes an interface 58 for receiving, from each of the network elements in real time, various traffic data (statistics) that the switches and their associated components accumulate over a predetermined period of time—illustratively thirty minutes. At the beginning of each such period, the traffic data management module 54 collects from each of the switches the traffic data that the switch and its components accumulated over the preceding period. Such traffic data may include, for example, measurements such as (a) peg counts (the total number of calls the switch attempted, as well the number attempted by the various components of the switch), (b) overflow counts (the number of calls which were blocked as a result of an all-trunks busy condition, (c) usage counts (average usage of the trunk group used to complete associated calls), and (d) the number of trunks in that group that were maintenance busy during each time interval. In a telephone communications network, for example, this information may be used to monitor network element utilization so as to ensure that telephone subscribers are receiving an appropriate quality of service, to enable telephone company personnel to view and report customer usage of particular services, switch modules, or trunks, and to provide information for engineering and forecasting analysis.

In accordance with the present invention, however, the traffic data measurements are also thresholded, that is, compared to respective ranges of values corresponding to normal, expected levels of element performance. When a measurement falls outside its corresponding range, indicating a traffic abnormality, an exception message is generated and sent to the network surveillance module 52. These exception messages may signify service affecting problems that should be brought to the attention of the technician for purposes of problem diagnosis and for maintenance resource allocation. In this regard, it should be noted that a large number of service affecting traffic data exception thresholds may be defined for use by the network support system of the present invention. An example of a useful traffic exception would be a high announcement trunk group count. High traffic on announcement trunk groups points to failures of calls in the associated switch. By looking at the announcement trunk groups, a technician can identify the type of errors which are causing the failures.

Another example of a traffic data measurement or "exception condition" indicative of a problem affecting the level of service being provided by the network are non-zero overflow counts. Non-zero overflow counts, as for example tone decoder overflow or trunk decoder overflow counts, may suggest resource failures. Additional traffic measurements that may be tied to maintenance issues/alarms are presented in Table I.

TABLE I

| Measurement | Maintenance Issue |
|---|---|
| Dial Tone Delay | Line Unit Hardware Malfunction |
| | Circuit Pack Trouble |
| | Tone Decoder Out of Service |
| Tone Decoder Attachment Delay | Tone Decoder Out of Service |
| Terminating Blockage | Line Unit Hardware Malfunction |
| Reorder Peg Count | Hardware Malfunction |
| | Trunk Malfunction |

Once traffic measurements indicative of service affecting problems have been identified, thresholds for each measurement can be defined and monitored by appropriate software instructions within process 62 so that exception conditions can be detected in the incoming raw data. Process 62 can be configured to validate the data, scan it for user-defined exception conditions such as those described above, and store it in a suitable data base such as relational database 64. Reference data, such as configuration information about the network elements, may also be stored in the database. As traffic exception conditions are detected, corresponding messages are supplied to the network surveillance module 52 via a suitable data transmission line 66. The information collected by traffic data management module 54 is also supplied to process 62 and may be stored in database 64 for subsequent analysis by network engineers and planners.

Although the illustrative embodiment of FIG. 2A depicts two individual modules 52, 54 having independent processors coupled by a physical interface in the form of transmission line 66, it will of course be readily apparent to those skilled in the art that other realizations for implementing the surveillance process of the present invention may also be utilized. If desired, for example, network surveillance and traffic data management functions may be performed by a single processor, thereby obviating the need for a physical interface such as transmission line 66 between the respective processors. Such an alternative arrangement is shown in FIG. 2B, in which a single processor 70 executes both the alarm surveillance and traffic data analysis operations associated with modules 52 and 54, respectively, of the first-described preceding embodiment.

It is anticipated that many of the exception conditions that may be detected by traffic data management module 54 will indicate that a component of a switch is showing an abnormally high (or low) amount of utilization. By supplying the surveillance technician with indications of such abnormal utilization, it should be possible to both detect problems that have not yet been reported as alarms to the surveillance module, and thereby do a better job at troubleshooting those alarm conditions which have already been detected. Moreover, by identifying which of the known problems are causing service-affecting overflow conditions in the utilization of traffic-sensitive components of the switch, the arrangement of the present invention facilitates the optimal assignment of maintenance resources to service restoration activities.

In further accordance with the present invention, a technician/network administrator may monitor the network from a suitable workstation having a terminal, such as the terminal 57. There are, of course, many ways of presenting this information to the technician, and the precise manner in which the information is output or displayed is not considered to be a novel aspect of the present invention. By way of example, however, a graphical user interface may be utilized to present a map of the technician's assigned territory. On such a graphics display, an icon corresponding to each office in the territory may be displayed. The technician may "click" on a selected icon to view any recent traffic reports that exist for that office or, if desired, establish an on-line relationship with the traffic data management module associated with that office.

To enhance the response time of the technician, the icon of an office having a network element in which a problem is detected may, for example, be programmed to flash or change color to signify an alarm condition. In response to the display of the alarm condition, the technician may click on the icon to obtain additional information about the problem. In this context, the traffic data may be utilized to perform troubleshooting of the problem and to determine the extent of its service level impact.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method for prioritizing maintenance problems in a communications network having a plurality of network elements, comprising:

interfacing with the network elements to gather in real-time and at predetermined time intervals, traffic data corresponding to measured levels of utilization of the plural network elements;

storing said gathered traffic data in a database for subsequent analysis by network planners;

processing said stored traffic data by comparing utilization level measurements obtained during said interfacing step with a predetermined range of acceptable values in order to detect first and second measurements outside of said predetermined range;

said processing step generating first and second traffic data exception messages corresponding to first and second detected measurements outside of said range, said first traffic data exception message indicative of a first traffic abnormality having a first traffic affecting severity level, and said second traffic data exception message indicative of a second traffic abnormality having a second traffic affecting severity level;

comparing, in said processing step, said first traffic affecting severity level to said second traffic affecting severity level and generating a comparison output; and outputting to a message center said first and second traffic data exception messages along with a representation of the traffic affecting severity levels associated therewith and said comparison output, so as to provide maintenance personnel with a priority of maintenance problems requiring repair.

2. The method according to claim 1, wherein said processing step further comprises:

utilizing one of said first and second traffic data exception messages to identify in at least one of the network elements, at least one malfunction having an impact upon service to subscribers of the network.

3. The method according to claim 1, wherein said processing step comprises:

utilizing, one of said first and second traffic data exception messages to identify at least one malfunctioning network element; and associating one of said first and second traffic data exception messages with the malfunctioning network element for use in evaluating an impact on subscriber service as a result of a malfunctioning network element and maintenance activities on plural malfunctioning network elements.

4. The method of claim 3, wherein said processing step further comprises receiving network element failure messages indicative of detected equipment malfunctions.

5. The method of claim 4, wherein said outputting step includes displaying an alarm in response to at least one of a network element failure message and said first and said second traffic data exception messages.

6. The method of claim 1, wherein said interfacing step comprises gathering summary data collected during said predetermined intervals by at least one of the network elements said summary data being indicative of subscriber usage of a telecommunication service.

7. The method of claim 1, wherein said predetermined time intervals are thirty minute intervals.

8. The method of claim 1, wherein one of said measured levels of utilization is a number of failures encountered by at least one network element.

9. The method of claim 1, wherein one of said measured levels of utilization is a number of events encountered by at least one network element.

10. The method of claim 1, wherein one of said measured levels of utilization is an amount of time that at least one network element is in use during an interval.

11. The method of claim 1, wherein said outputting step includes displaying an alarm in response to a traffic data exception message.

* * * * *